UNITED STATES PATENT OFFICE 2,045,080

MANUFACTURE OF MOLDED ARTICLES

Max Hagedorn, Dessau in Anhalt, Germany, assignor to Agfa Ansco Corporation, Binghamton, N. Y., a corporation of New York No Drawing. Application June 1, 1933, Serial No. 673,927. In Germany June 2, 1932

13 Claims. (Cl. 18—55)

My present invention relates to the manufacture of shaped articles from the heavy metal salts of polymeric carboxylic acids.

One of its objects is a process of manufacturing shaped articles such as films, fibers, plates and the like from the heavy metal salts of polymeric carboxylic acids. Another object is the artificial articles made from the heavy metal salts of polymeric carboxylic acids.

I have found that certain metal salts of the polymeric carboxylic acids which are rich in carboxy groups can be used for the manufacture of sheets, fibers and the like. As metals which are contemplated I enumerate the metals of the magnesium family, the aluminium family, the iron period, the chromium family, the antimony family, the tin family, and the copper family of the periodic system. As polymeric carboxylic acids enter into consideration, for instance, polyacrylic acid, or the acids derived from the polymerization product from a mixture of styrol and maleic acid or its anhydride, the polymerization product from a mixture of vinyl butylether and maleic acid or its anhydride, the polymerization product from a mixture of styrol and fumaric acid and the polymerization product from a mixture of methylenemalonic acid and styrol. For the polymerization there may also be used acid anhydrides or esters which after the condensation are transformed into the polymeric acids or their sodium salts. According to the metal selected the articles particularly in form of films may have properties which render them suitable for various purposes. When using metals of high atomic weight, the metal may be the predominant constituent of the finished article especially if the acid contains a great many carboxy groups. Thus, for instance, the substances containing Hg and Bi are applicable for medical purposes, for instance, films may be used for poultices in the treatment of wounds or in the treatment of eczemas or herpes; the substances containing Ag, Pb, U and Ni may be used for photographic purposes, for instance, for the manufacture of light filters absorbing rays of any kind; the substances containing Pb, and Th may be used in X-ray technics, for instance, for screening effects; the substances containing Fe may be used for electrotechnical purposes. The films or foils made from the mercury salt may contain more than 70% of Hg; a film produced from silver polyacrylate acid contains about 60% of Ag.

The solutions to be used for the manufacture of the desired articles are made by causing an aqueous solution of the free polymeric carboxylic acids to react with the metal compounds, or, when starting from the alkali salts of the poly acids named, the desired salts are obtained by subjecting these salts to a double decomposition with the salts of the desired cation-forming elements. If the salts form deposits insoluble in water, these are filtered off and are freed from the electrolytes by washing with water. The pure metal salts are then passed again into solution by means of a feebly alkaline medium, and now form metal salt solutions of a highly colloidal consistency. Preferably dilute solutions of alkali or alkali carbonate are used for this purpose, there may, however, also be employed nitrogenous bases such as ammonia, triethanolamine or the like. If, by the double decomposition, soluble metal salts are obtained, the same are precipitated with alcohols, such as methanol or ethyl alcohol and washed out or extracted for eliminating the electrolytes. After drying, the preparation of pure colloidal metal salt solutions is also possible, by dissolving these salts in water.

The starting materials which proved particularly suitable for the purpose in question are the alkali salts of the polyacrylic acid having the following formula—

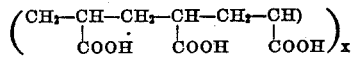

The articles may be made from the metal salts of the polymeric carboxylic acids by casting solutions of these metal salts or by forming the metal salts preferably in a state of fine division and eventually in admixture with softening agents, under the application of heat and pressure.

The following examples illustrate the invention:

*Example 1.*—12 grams of silver nitrate are dissolved in 100 cc. of water and added to a solution of 5.5 grams of sodium polyacrylate in 300 cc. of water. There is formed a deposit of silver polyacrylate which is filtered by suction and freed from its electrolytic constituents by washing it with water. The silver polyacrylate is dissolved in water with addition of a small amount of ammonia to form a solution of 5-10% strength and from this solution a film is made which may be applied for various photographic purposes.

Due to the sensitiveness of the silver to light all operations must be carried out in the dark.

*Example 2.*—200 grams of mercury nitrate are dissolved in 500 cc. of water with addition of a small amount of nitric acid. This solution is mixed with a solution of 50 grams of sodium polyacrylate in 1000 cc. of water. The deposit formed is filtered off by suction, washed with a 2% aqueous solution of nitric acid and then with distilled water. By dissolution in dilute ammonia, preferably with addition of a small amount of triethanolamine, the mercury polyacrylate is transformed into a highly viscous colloidal solution which by evaporation yields glass-clear and flexible films.

*Example 3.*—To a 5 per cent aqueous solution of sodium polyacrylate a solution of ferric chloride is added in such an amount that the latter component is present in excess. The deposit formed is filtered off by suction washed and re-dissolved in dilute ammonia. On evaporation this solution yields flexible brown films consisting of ferric polyacrylate.

*Example 4.*—270 grams of thallium nitrate are dissolved while heating, in 2½ liters of water and added to a solution of 94 grams of sodium polyacrylate in 2½ liters of water. On addition of 5 liters of methanol the thallium polyacrylate is precipitated and is freed from electrolytic constituents by extraction with methanol. The dry salt dissolves in distilled water to a highly viscous solution which, on evaporation, yields clear, transparent films or may be spun to threads.

*Example 5.*—1 gram molecule of nickel sulfate is dissolved in water and this solution is mixed with an aqueous solution of polyacrylic acid. The light green precipitate is purified by repeated washing with water and is dissolved in a dilute aqueous solution of ammonia if desired with the addition of softening agents such as hydroxyalkylamine or polymethylen oxides or other similar compounds which are soluble in water. The solution may be made into films, threads and the like.

*Example 6.*—The polymerization product of maleic acid and nylmethylether (equal molecular proportions) is dissolved in the calculated quantity of an aqueous solution of NaOH. This solution is added to the aqueous solution of potassium alum containing the alum in excess over the quantity of sodium salts to be acted upon. The water-insoluble precipitate of the aluminium salt of the polymerization product is washed with water and dissolved in a dilute aqueous solution of ammonia. This solution may be made into films, threads and the like.

*Example 7.*—An aqueous solution of the sodium salt of the polymerization product from a mixture of the nitrile of acrylic acid and acrylic acid (two molecular proportions of the nitrile and 3 molecular proportions of the acid) is mixed with an aqueous solution of cobalt nitrate. The precipitate is purified by washing with water and is dissolved in a diluted aqueous solution of ammonia to a brown red solution. This solution may be made into films, threads and the like.

*Example 8.*—An aqueous solution of the polymerization product from a mixture of maleic acid anhydride and styrol (equal molecular proportions) is mixed with an aqueous solution of zinc chloride. The white zinc salt of the polymerization product which precipitates is thoroughly washed with distilled water and dissolved in water having a pH value greater than 7. For producing this pH value there may be used strongly diluted solutions of alkali, of ammonia or amines as far as they are soluble in water. The solution thus obtained may be made into films, threads or the like.

*Example 9.*—The polymerization product from a mixture of methylene malonic acid ethyl ester and styrol is saponified to the sodium salt and the same is transformed into the cadmium salt by means of double decomposition. The cadmium salt is dissolved in water having a pH value greater than 7. This solution may be made into films, threads or the like.

*Example 10.*—300 grams of the copper salt of the polymerization product from a mixture of styrol and maleic acid anhydride, as it is obtainable by dissolving the polymerization product in dilute alkali and reacting on this solution with a solution of copper sulfate washing the precipitate with water and drying the same, are mixed with 150 grams of triethanolamine and 5 to 10 cc. of a concentrated aqueous solution of ammonia and worked into a paste which is dried and pulverized. The dry powder is formed into blue transparent plates at a temperature of 60° to 100° C. under a pressure of several atmospheres by means of a hydraulic press.

The foils prepared according to the foregoing examples may also be burnt to spongy metal foils. Thus for instance, a foil obtained according to Example 1, may be burnt to a silver foil which may be used for various, for instance, catalytic purposes.

The films according to this invention may be clear and colorless but also opaque or colored according to the particular salt employed. Generally the surface of the film is surprisingly hard. Undesired brittleness of the films may be avoided by giving the films additions of softening agents.

What I claim is:

1. In the manufacture of shaped articles the steps which comprise reacting with the solution of a metal salt of a metal selected from the group consisting of the magnesium family, the aluminium family, the iron period, the chromium family, the antimony family, the tin family, and the copper family of the periodic system on a solution of a compound selected from the group consisting of polymeric carboxylic acids and their alkali metal salts and transforming the reaction product into a shaped article.

2. In the manufacture of shaped articles the steps which comprise reacting with the solution of a metal salt of a metal selected from the group consisting of the magnesium family, the aluminium family, the iron period, the chromium family, the antimony family, the tin family, and the copper family of the periodic system on a solution of a compound selected from the group consisting of polymeric carboxylic acids and their alkali metal salts, washing the metal salts obtained, dissolving the same in a feebly alkaline aqueous solution, and casting a film from said solution.

3. In the manufacture of shaped articles the steps which comprise reacting with the solution of a metal salt of a metal selected from the group consisting of the magnesium family, the aluminium family, the iron period, the chromium family, the antimony family, the tin family, and the copper family of the periodic system on a solution of a compound selected from the group consisting of polymeric carboxylic acids and their alkali metal salts, washing the metal salts obtained, dissolving the same in a feebly alkaline aqueous solution of a softening agent, and casting a film from said solution.

4. In the manufacture of shaped articles the steps which comprise reacting with the solution of a metal salt of a metal selected from the group consisting of the magnesium family, the aluminium family, the iron period, the chromium family, the antimony family, the tin family, and the copper family of the periodic system on a solution of a compound selected from the group consisting of polymeric carboxylic acids and their alkali metal salts, washing the metal salts obtained, drying said metal salts and molding said metal salts by means of heat and pressure.

5. In the manufacture of shaped articles the steps which comprise reacting with the solution of a metal salt of a metal selected from the group consisting of the magnesium family, the aluminium family, the iron period, the chromium family, the antimony family, the tin family, and the copper family of the periodic system on a solution of a compound selected from the group consisting of polymeric carboxylic acids and their alkali metal salts, washing the metal salts obtained, drying said metal salts, mixing said metal salts with a softening agent and molding said mixture by means of heat and pressure.

6. In the manufacture of shaped articles the steps which comprise dissolving nickel sulfate in water, mixing said solution with a solution of polyacrylic acid, washing the precipitate with water, dissolving the same in a diluted aqueous solution of ammonia, and casting a film from said solution.

7. In the manufacture of shaped articles the steps which comprise dissolving the polymerization product from a mixture of styrol and maleic acid anhydride in dilute alkali, reacting on this solution with a solution of copper sulfate, washing the precipitated copper salt with water, drying said copper salt, mixing said copper salt with triethanolamine and concentrated ammonia, working the mixture into a paste, drying said paste, pulverizing said paste, and molding said powder by means of heat and pressure.

8. A shaped article substantially consisting of the salt of a metal selected from the family consisting of the magnesium family, the aluminium family, the iron period, the chromium family, the antimony family, the tin family, and the copper family of the periodic system and an acid selected from the group consisting of polymeric carboxylic acids and their alkali metal salts.

9. A shaped article substantially consisting of the salt of a metal selected from the family consisting of the magnesium family, the aluminium family, the iron period, the chromium family, the antimony family, the tin family, and the copper family of the periodic system and an acid selected from the group consisting of polymeric carboxylic acids and their alkali metal salts and a softening agent.

10. A shaped article substantially consisting of silver polyacrylate.

11. A shaped article substantially consisting of nickel polyacrylate.

12. A shaped article substantially consisting of the copper salt of the polymerization product from a mixture of maleic acid anhydride and styrol.

13. In the manufacture of shaped articles the steps which comprise dissolving silver nitrate in water, mixing said solution of silver nitrate with a solution of sodium polyacrylate, washing the precipitated silver polyacrylate with water, dissolving said silver polyacrylate in an aqueous solution of ammonia, and casting a film from said solution.

MAX HAGEDORN.